Sept. 27, 1932.  G. H. NOBBS  1,880,023
POWER TRACTOR UNIT
Filed March 11, 1930   3 Sheets-Sheet 1
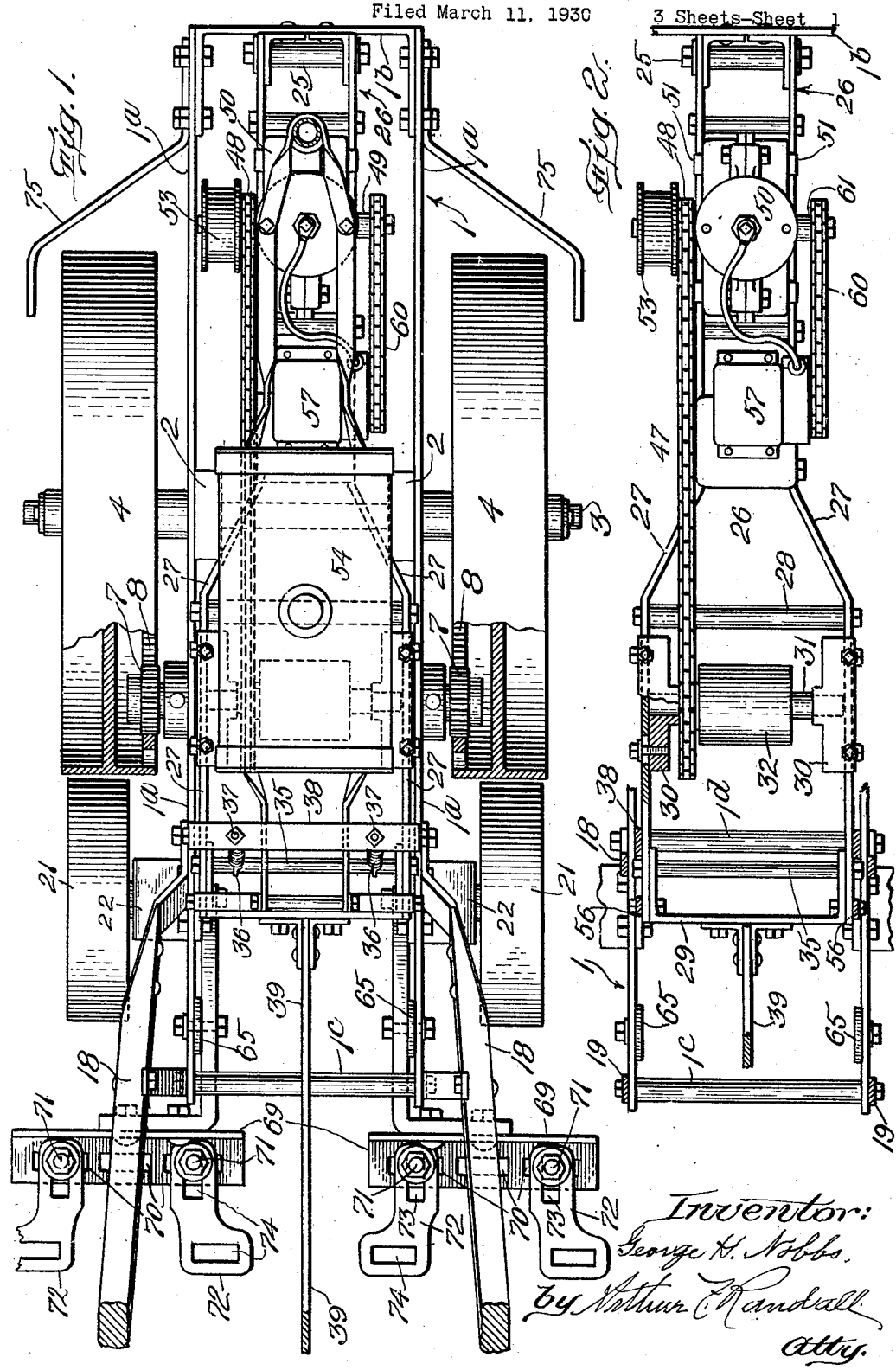

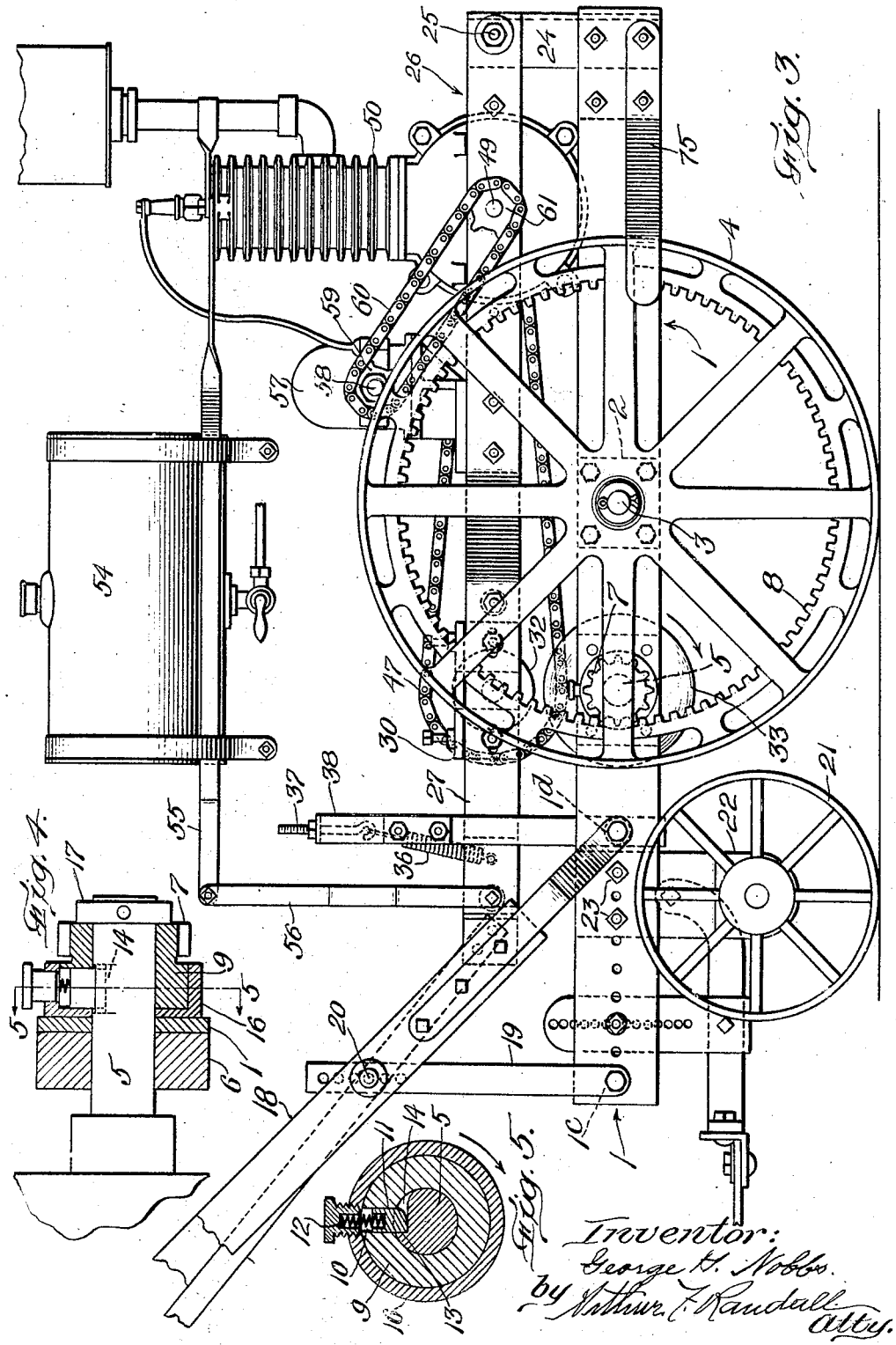

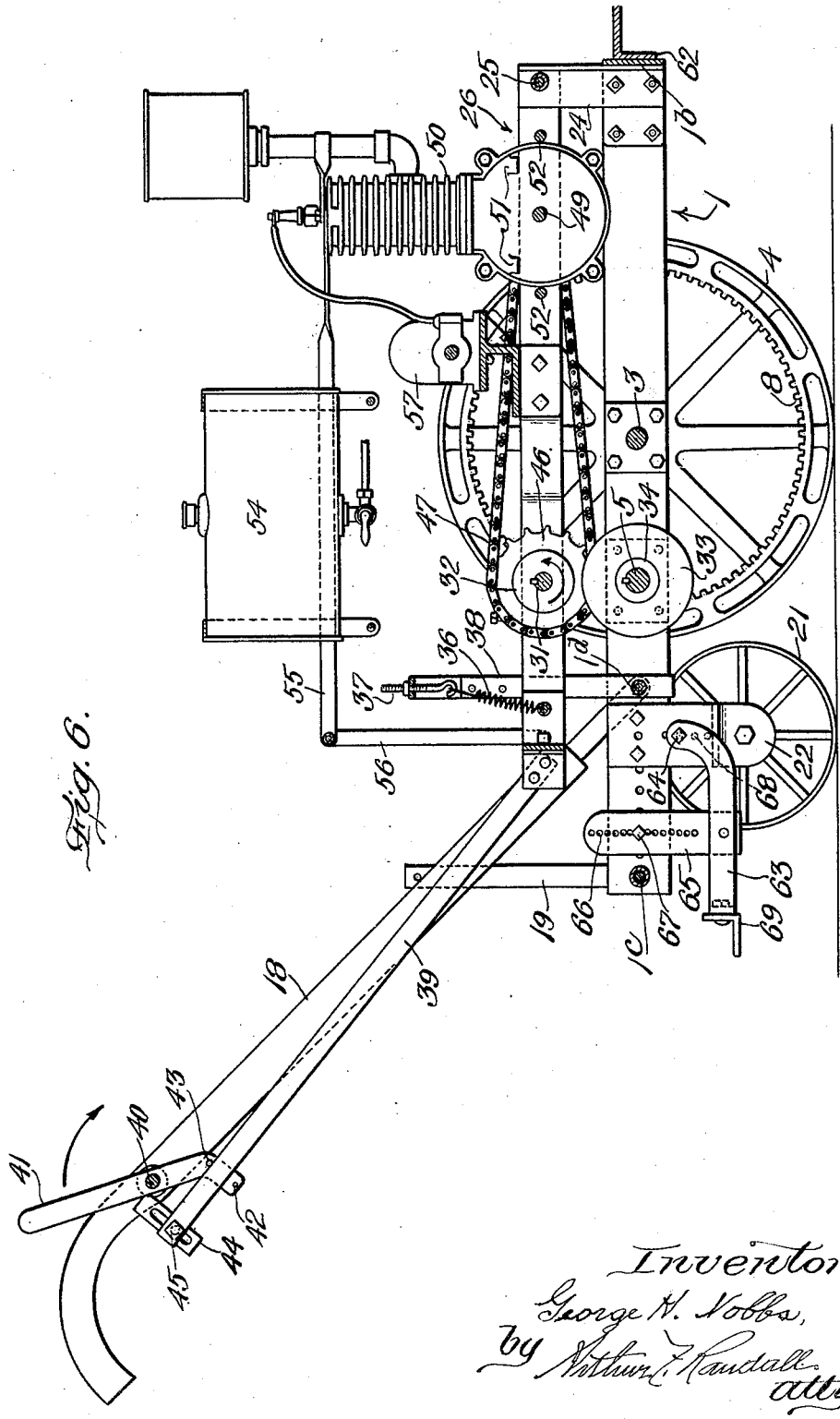

Patented Sept. 27, 1932

1,880,023

UNITED STATES PATENT OFFICE

GEORGE H. NOBBS, OF WATERTOWN, MASSACHUSETTS

POWER TRACTOR UNIT

Application filed March 11, 1930. Serial No. 434,997.

My invention relates to tractor power units adapted for use in performing work which ordinarily has heretofore been performed by hand labor with hand tools such as the cultivation of garden crops, mowing lawns, removing snow from sidewalks and the like, and it has for its object to provide an improved machine of this class of simple efficient construction; well balanced and easy to operate.

To these ends I have provided a tractor power unit or machine having the peculiar features of construction and mode of operation set forth in the following description, the several novel features of the invention being particularly pointed out and defined separately in the claims at the close thereof.

In the accompanying drawings:—

Figure 1 is a plan view partly broken away and in section of a garden tractor constructed in accordance with my invention.

Figure 2 is a plan view of some of the parts illustrated in Figure 1.

Figure 3 is a side elevation of the garden tractor illustrated in Figure 1.

Figure 4 is a sectional detail hereinafter described.

Figure 5 is a section on line 5—5 of Figure 4.

Figure 6 is a longitudinal sectional view of the tractor taken on a vertical plane near the middle thereof.

My invention is herein shown as embodied in a comparatively small tractor power unit that is steered and controlled manually and which is particularly adapted for light work such as garden harrowing, lawn mowing and other garden work ordinarily performed by hand labor, with hand tools, in the cultivation of garden crops.

The illustrated embodiment of my invention comprises a main horizontal frame 1 provided near its middle with boxes or bearings 2, 2, one at each side thereof in which is mounted an axle 3. The opposite ends of this axle 3 extend beyond the main frame 1 and have loosely mounted thereon relatively large traction wheels 4 which rest upon the ground.

A short distance to the rear of the axle 3 is a transverse wheel driving shaft 5 journaled in bearings provided at the opposite sides of the main frame 1, one of said bearings being shown at 6 in Fig. 4.

The opposite end portions of the shaft 5 extend beyond the side bars of the main frame 1 and each has loosely mounted upon it a pinion 7 that is in mesh with an internal gear 8 provided within the adjacent traction wheel 4.

The hub 9 of each pinion 7 (see Figs 4 and 5) is made with a radial pocket 10 within which is mounted a radially slidable pawl member 11 that is yieldingly urged inwardly against the shaft 5 by a spring 12 so as to cooperate with an abutment shoulder 13 provided at one side of a notch 14 formed in shaft 5. The shoulders 13 are positioned so that each engages its pawl member 11 when the shaft 5 is rotated in the direction of the arrows shown in Figs. 3 and 5. Thus when the shaft 5 is driven in the direction indicated by the arrows it acts through the abutment shoulders 13 and pawl members 11 to turn the pinions 7 in the direction of the arrows thereby rotating the traction wheels 4 and propelling the tractor forward.

The hub 9 of each pinion 7 is forcibly driven into a cup-shaped hub section 16. Thus the hub of each pinion 7 comprises the two parts 9 and 16 which are permanently fastened together, the cup-shaped part 16 serving to hold the pawl member 11 within the pocket 10 of the part 9 of the hub.

Collars 17 fixed to the outer ends of shaft 5 hold the latter against endwise movement and also serve to hold the pinions 7 in position on said shaft.

The main frame 1 comprises two longitudinal side bars 1a connected at their forward ends by a cross-bar 1b and near their rear ends by the stay bolts 1c and 1d.

The stay bolt 1d serves to pivotally connect the lower ends of a pair of handle bars 18 to the side bars of the main frame 1, while the stay bolt 1c serves to pivotally connect the lower ends of a pair of struts or braces 19 to said side bars.

The upper end portion of each strut or brace 19 is made with a longitudinal row of apertures for the reception of a bolt 20, Fig.

3, by means of which said upper end portion is fastened to one of the handle bars 18. In this way the two handle bars are rigidly connected with the side bars of the main frame 1 so that the rear free ends of said handle bars can be adjusted up and down on the stay bolt 1d as a pivot and fixed in position at a height suitable to the user of the tractor.

Directly behind each main traction wheel 4 is provided a relatively small ground wheel or truck 21 rotatably mounted at the lower end of a bracket 22 fastened by bolts 23 to the adjacent side bar 1a of the main frame 1.

At its forward end the main frame 1 is constructed with two upstanding posts 24, one at each side thereof, to the upper ends of which is pivotally connected, at 25, one end of a supplemental lever-frame designated generally by the reference numeral 26. The pivotal connection 25 is shown as a stay bolt.

The supplemental lever-frame 26 is disposed directly above the main frame 1 and extends rearwardly from the pivotal connection 25 so that the main portion thereof is disposed approximately parallel with, and above, said main frame 1.

As shown in Fig. 2 the supplemental lever-frame 26 includes two side bars 27 connected intermediate their ends by a stay bolt 28 and at their rear ends by a cross-bar 29. Adjustably fixed to each side bar 27 is a journal box 30 and these two journal boxes support a transverse main drive shaft 31 carrying an iron or steel drum 32 which co-operates with a rubber roll or drum 33 having a metal bushing or hub portion 34 that is keyed upon the shaft 5.

The steel roll or drum 32 is disposed directly above the rubber roll or drum 33 and it will be clear that when the supplemental lever-frame 26 is swung up and down on its pivot 25 the roll or drum 32 is moved into and out of engagement with the rubber roll or drum 33.

The supplemental lever-frame 26 is made with a cross-bar 35 to which are fastened the lower ends of a pair of coiled springs 36, the upper end of each of these springs being fastened by means of an adjustable bolt 37 to the top cross-bar of a bail-shaped bracket 38 fastened to and extending upwardly from the main frame 1.

The supplemental lever frame 26 includes as a part thereof a rearwardly and upwardly extending bar 39 whose lower end is fastened rigidly to the side bars 27 of lever frame 26 by rivets. The upper end portion of the bar 39 is disposed in proximity to a cross-bar 40 connected at its opposite ends with the handle bars 18 and on this cross-bar is pivotally mounted a hand lever 41, one arm of which occupies a position alongside of the bar 39 and is provided with two laterally extending studs 42 and 43 occupying positions, respectively, below and above the bar 39. The upper end of the bar 39 is provided with a slotted stop member 44 that is adjustably fastened to said bar by means of a bolt 45.

When the supplemental lever frame 26 is supported by the springs 36 at the limit of its upward movement the stop member 44 is in engagement with the hand lever 41 adjacent the fulcrum thereof and the drive roll 32 is out of engagement with the driven roll 33.

The shaft 31 carries a sprocket wheel 46 connected by a chain 47 with a sprocket wheel 48, Figs. 1 and 6, the latter being fast on the crank shaft 49 of an internal combustion engine 50.

The crank shaft 49 of engine 50 is journaled in bearings provided in the opposite side bars 27 of the lever frame 26 and the crank case of said engine is provided at its opposite sides with lugs 51 resting upon the top sides of the side bars 27. Stay bolts 52 at opposite sides of the crank case of the engine serve to clamp the side bars 27 firmly against the opposite sides of said crank case. In this way the crank case of engine 50 is rigidly connected with the lever frame.

Outside of the sprocket wheel 48 the crank shaft 49 of engine 50 is provided with a flanged pulley 53 adapted to have wound thereon a flexible cable by means of which the engine is manually started or "cranked."

Above the lever frame 26 is provided a fuel reservoir 54 that is supported by bars 55 and 56 connected, respectively, with engine 50 and the lever frame 26.

The lever frame 26 has fastened to it a bracket carrying a magneto 57 connected with the spark plug of engine 50, and the shaft 58 of magneto 57 carries a sprocket wheel 59 connected by a chain 60 with a sprocket wheel 61 fast on the crank shaft of engine 50.

When the above described tractor power unit is in use the engine 50 is in operation and serves to continuously rotate the driving drum 32 in the direction indicated by the arrow in Fig. 6. It will therefore be clear that if hand lever 41 is thrown forward the stud 43 will operate through the bar 39 to swing the lever frame 26 downwardly on its fulcrum 25 thereby forcing the driving drum 32 into engagement with the driven drum 33. The bar 39 is a stiffly flexible bar of metal and when hand lever 41 is thrown forward as described its movement in this direction is limited by its engagement with the stop member 44 and the stud 43 is then directly between cross-bar 40 and bar 39 so that the latter serves to hold the hand lever 41 at the limit of its forward movement.

During this forward movement of the hand lever 41 the bar 39 is flexed so that during the operation of the machine the driving roll 32 is forcibly but yieldingly held against the driving drum 33. The driving drum 32 then acts through the driven drum 33, shaft 5, and pinions 7 to rotate the wheels 4 in a direction to propel the machine forwardly over the ground.

The front cross-bar 1b, Fig. 6, of the main frame 1 has attached to its front side a bracket 62 by means of which a lawn mower may be connected with the frame 1.

At the rear of the main frame 1 I provide two bracket arms 63 each pivotally fastened at 64 to the inner side of one of the brackets 22, the latter being rigidly bolted to its side bar of the frame 1.

Intermediate its ends each bracket arm 63 is pivotally connected with the lower end of a link 65 made with a longitudinal row of holes 66 for the reception of a bolt 67 by means of which the upper end portion of each link 65 is securely fastened to the adjacent side bar of frame 1. The bracket 22 to which the forward end of each bracket arm 63 is fastened is also made with a longitudinal row of holes 68 for the reception of the bolt 64.

Each bracket arm 63 has bolted to its rear end a horizontal length of angle iron 69 formed with longitudinal slots 70, Fig. 1, for the reception of bolts 71 by means of which supplemental brackets 72 are fastened rigidly to said angle iron piece 69.

Each supplemental bracket 72 is formed at one end with a slot 73 for the reception of its bolt 71 and at its opposite end with a slot 74 for the reception of a bolt by means of which a pointed harrow tooth may be secured thereto. The intermediate slot 70 of each angle iron piece 69 is for the reception of a bolt by means of which a pointed harrow tooth may be secured directly to said angle iron piece 69. It will also be clear that the slotted angle iron pieces 69 to provide means by which tools of various kinds may be secured to the machine.

It will be clear from Fig. 6 that by vertical adjustment of the bolt 64 and link 65 the height from the ground of the rear end pieces 69 of the bracket arms 63 may be varied as desired, and also that by adjusting bolt 64 up or down in one direction and the link 65 up or down in the opposite direction, each bracket arm 63 may be fixed in an inclined position. Thus when harrow teeth are fastened to the end pieces 69 the pitch of the points thereof may be adjusted as required which is a feature of advantage.

Secured to the opposite sides of the main frame 1 adjacent its forward end is a pair of outwardly and rearwardly extending deflector blades 75 which serve to prevent the branches of plants or the like from passing under the traction wheels 4 or between the wheels and the body.

It is a feature of advantage with the above described construction that the friction-wheels are disposed within their frames so that the latter, to a degree, serve as housings therefor. Furthermore, said friction-wheels being wholly independent of the traction-wheels do not accumulate cut grass when the tractor is employed to propel a lawn mower. Also, since both friction-wheels are preferably made with smooth peripheries they are devoid of pockets or grooves within which foreign matter could collect or become packed.

It is also a feature of advantage that the mechanism for rotating the driven friction-wheel is a separately removable unit including the motor, the generator and other adjuncts of the motor, as well as the fuel reservoir. Thus this power unit of the machine can be removed in its entirety when desired simply by removing the pivotal bolt 25 and the bail-shaped frame 38.

It will also be clear that the above described construction has the advantage that the operator may, at times utilize the rearward extension 39 of the supplemental frame as a handle by means of which he can regulate the engagement between the two friction-wheels with one hand thereby to control the speed of the tractor while utilizing the other hand to steer the same.

What I claim is:

1. A power tractor comprising a main frame; two supporting traction-wheels for said main frame, one at each side thereof and each made with a concentric gear; handle means connected with said main frame by which the progress of the latter is manually directed; a shaft journaled on said main frame; a rotatably supported pinion engaging the gear of each traction-wheel; clutch means through which rotation of said shaft in one direction only operates each pinion; a driven friction-wheel fast on said shaft; a supplemental frame pivotally mounted upon said main frame; a motor mounted on one of said frames; a driving friction-wheel rotatably mounted on said supplemental frame and movable bodily with the latter into and out of engagement with said driven friction-wheel when said supplemental frame is swung on its pivot; means through which said driving friction-wheel is continuously driven by said motor while the tractor is in use and means under the control of the operator for swinging said supplemental frame on its pivot to engage and disengage said friction-wheels and for holding said supplemental frame at the limit of its movement in each direction.

2. A power tractor comprising a main frame; two supporting traction-wheels for said main frame, one at each side thereof and each made with an internal gear; handle means connected with said main frame by which the progress of the latter is manually directed; a shaft journaled on said main frame between said traction-wheels; a rotatably supported pinion engaging the internal gear of each traction-wheel; clutch means through which rotation of said shaft in one direction only operates each pinion; a driven friction-wheel fast on said shaft and disposed between said traction-wheels; a supplemental frame pivotally mounted upon said main frame adjacent the forward end of the latter, said supplemental frame being made with a rearwardly projecting flexible extension; a motor mounted on one of said frames; a driving friction-wheel rotatably mounted on said supplemental frame and movable bodily with the latter into and out of engagement with said driven friction-wheel when said supplemental frame is swung on its pivot; means through which said driving friction-wheel is continuously driven by said motor while the tractor is in use; means for yieldingly holding said supplemental frame at the limit of its movement in one direction with said friction-wheels out of driving engagement, and a hand operated member movably supported by said handle means and operable to act through the rearward extension of said supplemental frame to swing the latter in a direction to engage said driving friction-wheel with said driven friction-wheel.

3. A power tractor comprising a main frame; two supporting traction-wheels for said main frame, one at each side thereof and each made with an internal gear; handle means connected with said main frame by which the progress of the latter is manually directed; a shaft journaled on said main frame between said traction wheels; a rotatably supported pinion engaging the internal gear of each traction-wheel; clutch means through which the rotation of said shaft in one direction only operates each pinion; a driven friction-wheel fast on said shaft and having a peripheral portion of yieldable material; a supplemental frame pivotally mounted upon said main frame; a motor mounted on one of said frames; a driving friction-wheel rotatably mounted on said supplemental frame and movable bodily with the latter into and out of engagement with said driven friction-wheel when said supplemental frame is swung on its pivot; gearing through which said driving friction-wheel is continuously driven by said motor while the tractor is in use, and means under the control of the operator for swinging said supplemental frame on its pivot to engage and disengage said friction-wheels and for holding said supplemental frame at the limit of its movement in each direction.

4. A power tractor comprising a main frame including two longitudinal side bars; two supporting traction-wheels for said main frame, one at each side thereof and each made with a concentric gear; handle means connected with the rear end portion of said main frame by which the progress of the latter is manually directed; a transverse shaft journaled on the side bars of said main frame; two pinions loosely mounted on said shaft each engaging the gear of one of said traction-wheels; clutch means through which rotation of said shaft in one direction only operates said pinions; a driven friction-wheel fast on said shaft and disposed between said side bars; a supplemental frame pivotally mounted upon said main frame; a motor mounted on said supplemental frame; a driving friction-wheel rotatably mounted on said supplemental frame and movable bodily with the latter into and out of engagement with said driven friction-wheel when said supplemental frame is swung on its pivot; means through which said motor rotates said driving friction-wheel; and means under the control of the operator for swinging said supplemental frame on its pivot to engage and disengage said friction-wheels and for holding said supplemental frame at the limit of its movement in each direction.

5. A power tractor constructed in accordance with claim 4 wherein said supplemental frame includes two oppositely disposed side bars between which said driving friction-wheel and said motor are disposed, and means for clamping said side bars against said motor.

Signed by me at Boston, Suffolk County, Massachusetts, this 7th day of March, 1930.

GEORGE H. NOBBS.